D. A. EAKEN.
TIRE SAVER.
APPLICATION FILED MAR. 26, 1915.
1,160,700.
Patented Nov. 16, 1915.
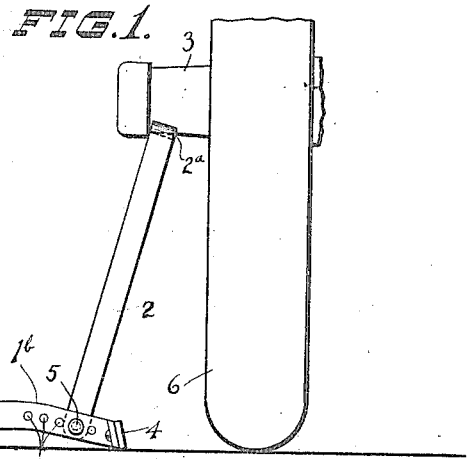
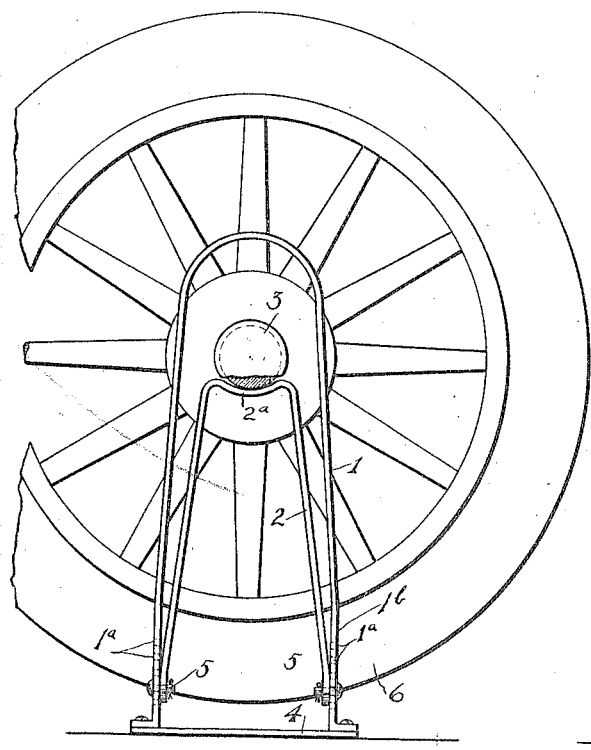
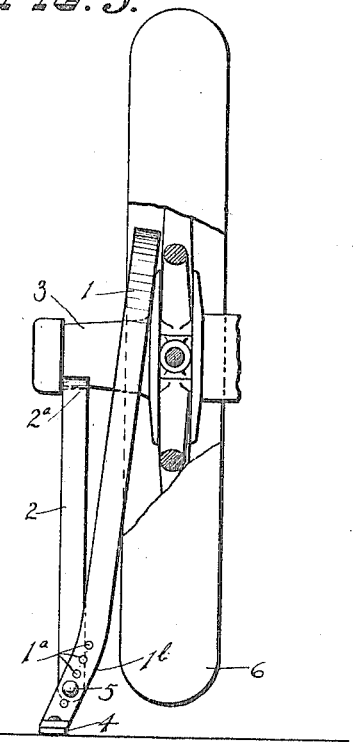
Witnesses
Geo. E. Kricker.
F. C. Adams.
Inventor
DWIGHT A. EAKEN.
By Obed C. Billman
Attorney

UNITED STATES PATENT OFFICE.

DWIGHT A. EAKEN, OF LODI, OHIO, ASSIGNOR OF ONE-HALF TO H. M. MYERS, OF LODI, OHIO.

TIRE-SAVER.

1,160,700.  Specification of Letters Patent.  Patented Nov. 16, 1915.

Application filed March 26, 1915. Serial No. 17,165.

*To all whom it may concern:*

Be it known that I, DWIGHT A. EAKEN, a citizen of the United States, residing at Lodi, in the county of Medina and State of Ohio, have invented certain new and useful Improvements in Tire-Savers, of which the following is a specification.

My invention relates to improvements in tire savers, and is particularly designed and adapted for use in connection with automobiles, and other vehicles employing pneumatic tires, for the purpose of elevating and sustaining the wheel axle portion of such vehicle in relieving the tires of the weight of the car or vehicle, when in the garage, or when not in use, and also protecting them from oil, moisture, dampness, and the like, thereby greatly protecting and prolonging the life or service of the tire.

The primary object of this invention is to provide a generally improved tire saver jack of this class, which will be exceedingly simple of construction, cheap of manufacture, and efficient in use.

A further object is the provision of a device of this class which may not only be easily and quickly applied to any ordinary wheel hub in elevating the wheel tire from the ground, but when so applied will form an improved wheel pedestal and brace for the elevated wheels thereby securely bracing the elevated vehicle as a whole as against lateral displacement, the operating lever and wheel lifting members of the device coöperating with each other when up for this purpose.

With the above mentioned and other ends in view, the invention consists in the novel construction, arrangement, and combination of parts, illustrated in one of its embodiments in the accompanying drawings, and particularly pointed out in the appended claims.

Referring to the drawings forming a part of this specification, Figure 1, is a view showing the initial application of the device to an ordinary wheel hub preparatory to lifting and sustaining the same for the purpose of relieving the tire, the wheel pedestal and bracing member when in this position forming conjointly with the wheel hub lifting member a toggle and toggle lever member of great power. Fig. 2, a side elevation of the same when the wheel and tire are elevated, the toggle lever member when thus elevated forming a combined wheel pedestal and brace for the elevated wheel thereby securely bracing the same as against lateral displacement. Fig. 3, an end view of the elevated wheel and tire, and illustrating the relative position of the lever in forming a wheel pedestal and brace and for coöperating with the wheel hub in bracing the wheel to prevent lateral displacement.

Similar numerals of reference designate like parts throughout all the figures of the drawings.

The improved device comprises a pedestal lever member 1, and a wheel hub engaging and lifting member 2, said lever member 1, being preferably arranged in the form of a loop as shown, and said hub engaging and lifting member 2, being likewise similarly formed to form a similarly shaped loop and being eccentrically and adjustably mounted therein, the head or hub engaging portion 2ª, being preferably of concavo-convex shape to form a suitable seat for the wheel hub 3, and it will also be observed that the hub engaging head 2ª, is spaced from the top of the loop 1, so that the latter may readily pass over the hub when in its uppermost or operative hub sustaining position as shown most clearly in Fig. 3 of the drawings. The lower ends of the lever loop member 1, are preferably provided with a lever fulcrum base plate 4.

As a means of eccentrically and adjustably connecting the hub lifting loop member 2, to the lever loop member 1, and particularly with respect to the lever fulcrum plate 4, the lower ends of the lifting loop member 2, are provided with removable pivot bearing bolts 5, adapted to be adjustably mounted in bolt receiving openings 1ª, whereby the device may be readily adjusted to wheels and tires of varying forms and diameters.

As a means of more effectively causing the pedestal loop member 1, to be normally swung inwardly past the dead center of the lifting loop or link 2, when the parts are in their normal or elevated position as shown in Figs. 2 and 3 of the drawings, as well as causing the pedestal lever member 1, to more effectively bear against and brace the wheel when in an elevated position, and also effectively coöperate with the hub engaging and lifting link or member 2, in bracing the wheel when elevated as against lateral displacement, the sides of the loop lever 1, are preferably offset as at 1ᵇ, and it will be readily apparent upon reference to Fig. 3 that the offset portion 1ᵇ, is brought into close proximity to the lower portion 6, of the tire, so that any lateral movement will cause this portion of the tire to come into engagement with the offset portion 1ᵇ, and prevent any further lateral movement, and it will also be apparent that the oppositely arranged device when applied to the opposite wheel will coöperate therewith in giving general stability to the vehicle body as a whole.

It will be readily apparent upon reference to Fig. 1 of the drawings that the loop members 1 and 2, form toggle loops, the loop or hub engaging and lifting member 2, forming a lifting link and the pedestal member 1, forming a toggle lever, having the base plate 4, as the lever fulcrum, and it is equally apparent that when the parts are in their elevated or wheel sustaining position as shown in Fig. 3, the parts 1 and 2, coöperate with each other in forming an exceedingly stable wheel sustaining and bracing pedestal for preventing lateral displacement as hereinbefore referred to.

From the foregoing description, taken in connection with the accompanying drawings, the operation and advantages of my invention will be readily understood.

Having thus described one of the embodiments of my invention, what I claim and desire to secure by Letters Patent, is,—

1. A tire saver, comprising U-shaped toggle loops, one of said loops being mounted within the other forming a lifting link loop and terminating short of the top of the other to receive a wheel hub, and the other forming a toggle lever loop when down and a wheel bracing pedestal when up, the sides of said toggle lever loop being provided with inwardly extending offset portions adapted to come into bracing engagement with the lower portion of the tire when elevated to prevent lateral displacement.

2. A tire saver, comprising a combined lever and pedestal loop having the lower ends of its side members offset and provided with a series of pivot bolt receiving openings, a lever fulcrum base plate carried by the lower ends of said side members of said loop, a U-shaped lifting loop mounted within said pedestal loop and terminating in a concavo-convex shaped hub engaging head spaced from the top of the latter to receive a wheel hub, and bearing bolts extending through the ends of said lifting loop and some of said bolt receiving openings.

3. A tire saver, comprising toggle loops of substantially U-shape, one being mounted within and shorter than the other forming a lifting link terminating in a concavo-convex shaped hub engaging portion, and the other being provided with perforated offset portions adjustably connected to the terminal portions of said lifting loop and adapted to come into bracing engagement with the lower portions of the sustained tire when elevated, the top portion of said loop resting against the sustained wheel above the elevated hub portion thereof, and a lever fulcrum base plate secured to the lower offset or terminal portions of said toggle lever loop.

4. A tire saver, comprising a combined lever and pedestal loop having its side members terminating in offset perforated portions, a lever fulcrum base plate carried by said offset portions of said side members, a wheel lifting loop adapted to swing within said pedestal loop and provided at one end with a concavo-convex shaped hub engaging head and at the other with removable bearing bolts extending through said perforated offset portions of the sides of said pedestal loop, said pedestal loop being normally swung inwardly past the dead center of said lifting loop and having its top resting against the sustained wheel above the hub portion thereof, said offset portions of said side members being adapted to rest in close proximity to the lower portion of the tire to abut against the latter to prevent lateral displacement when elevated.

In testimony whereof I have affixed my signature in presence of two witnesses.

DWIGHT A. EAKEN.

Witnesses:
  M. A. CODDING,
  F. H. WHITE.